United States Patent
Nezhadarya et al.

(10) Patent No.: US 10,970,871 B2
(45) Date of Patent: Apr. 6, 2021

(54) ESTIMATING TWO-DIMENSIONAL OBJECT BOUNDING BOX INFORMATION BASED ON BIRD'S-EYE VIEW POINT CLOUD

(71) Applicants: Ehsan Nezhadarya, Thornhill (CA); Yang Liu, North York (CA); Bingbing Liu, Singapore (SG)

(72) Inventors: Ehsan Nezhadarya, Thornhill (CA); Yang Liu, North York (CA); Bingbing Liu, Singapore (SG)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/380,273

(22) Filed: Apr. 10, 2019

(65) Prior Publication Data
US 2020/0082560 A1  Mar. 12, 2020

Related U.S. Application Data

(60) Provisional application No. 62/728,504, filed on Sep. 7, 2018.

(51) Int. Cl.
| G06T 7/73 | (2017.01) |
| G06T 17/10 | (2006.01) |
| G06N 3/08 | (2006.01) |
| G06T 15/20 | (2011.01) |

(52) U.S. Cl.
CPC .......... *G06T 7/73* (2017.01); *G06N 3/08* (2013.01); *G06T 15/20* (2013.01); *G06T 17/10* (2013.01); *G06T 2207/10028* (2013.01)

(58) Field of Classification Search
CPC .......... G06T 7/73; G06T 15/20; G06T 17/10; G06T 2207/10028; G06N 3/08
See application file for complete search history.

(56) References Cited

U.S. PATENT DOCUMENTS

| 2018/0129887 A1 | 5/2018 | Kang et al. |
| 2018/0190016 A1 | 7/2018 | Yang |
| 2018/0225861 A1 | 8/2018 | Petkov et al. |
| 2018/0232947 A1 | 8/2018 | Nehmadi et al. |
| 2018/0247447 A1* | 8/2018 | Serna .............. G06T 15/40 |
| 2018/0342077 A1* | 11/2018 | Tsuno ............ G06K 9/6256 |

FOREIGN PATENT DOCUMENTS

| JP | 2017117357 A | 6/2017 |
| JP | 2018114830 A | 7/2018 |

OTHER PUBLICATIONS

D. Kim, K. Jo, M. Lee, and M. Sunwoo, "L-Shape Model Switching-Based Precise Motion Tracking of Moving Vehicles Using Laser Scanners", IEEE Transactions on Intelligent Transportation Systems, vol. 19, No. 2, 2018.

(Continued)

*Primary Examiner* — Grace Q Li (57) ABSTRACT

Upon receiving a set of two-dimensional data points representing an object in an environment, a bounding box estimator estimates a bounding box vector representative of a two-dimensional version of the object that is represented by the two-dimensional data points.

15 Claims, 5 Drawing Sheets

(56) References Cited

OTHER PUBLICATIONS

R. A. MacLachlan and C. Mertz, "Tracking of Moving Objects from a Moving Vehicle Using a Scanning Laser Rangefinder", IEEE International Conference on Intelligent Transportation Systems, 2006.

X. Shen, S. Pendleton, and M. H. Ang, "Efficient L-shape Fitting of Laser Scanner Data for Vehicle Pose Estimation", IEEE Conference on Robotics, Automation and Mechatronics, 2015.

X. Zhang, W. Xu, C. Dong, and J. M. Dolan, "Efficient L-Shape Fitting for Vehicle Detection Using Laser Scanners", IEEE Intelligent Vehicle Symposium, 2017.

H. Zhao, Q. Zhang, M. Chiba, R. Shibasaki, J. Cui, and H. Zha, "Moving Object Classification using Horizontal Laser Scan Data", IEEE International Conference on Robotics and Automation, 2009.

W. Luo, B. Yang, and R. Urtasun, "Fast and Furious: Real Time End-to-End 3D Detection, Tracking and Motion Forecasting with a Single Convolutional Net", IEEE Conference on Computer Vision and Pattern Recognition, 2018.

B. Yang, W. Luo, and R. Urtasun, "PIXOR: Real-time 3D Object Detection from Point Clouds", IEEE Conference on Computer Vision and Pattern Recognition, 2018.

M. Ren, A. Pokrovsky, B. Yang, and R. Urtasun, "SBNet: Sparse Blocks Network for Fast Inference", IEEE Conference on Computer Vision and Pattern Recognition, 2018.

Y. Zhou and O. Tuzel, "VoxelNet: End-to-End Learning for Point Cloud Based 3D Object Detection", IEEE Conference on Computer Vision and Pattern Recognition, 2018.

C. R. Qi, W. Liu, C. Wu, H. Su, and L. J. Guibas, Frustum PointNets for 3D Object Detection from RGB-D Data, IEEE Conference on Computer Vision and Pattern Recognition, 2018.

J. Ku, M. Mozifian, J. Lee, A. Harakeh, and S. Waslander, "Joint 3D Proposal Generation and Object Detection from View Aggregation", arXiv preprint arXiv: 1712.02294, Dec. 2017.

C. R. Qi, H. Su, K. Mo, and L. J. Guibas, "PointNet: Deep Learning on Point Sets for 3D Classification and Segmentation", IEEE Conference on Computer Vision and Pattern Recognition, 2017.

X. Chen, H. Ma, J. Wan, B. Li, and T. Xia, "Multi-View 3D Object Detection Network for Autonomous Driving", IEEE Conference on Computer Vision and Pattern Recognition, 2017.

M. Himmelsbach, T. Luettel, and H.-J. Wuensche, "Real-time Object Classification in 3D Point Clouds Using Point Feature Histograms", IEEE/RSJ International Conference on Intelligent Robots and Systems, 2009.

H. Wang, B. Wang, B. Liu, X. Meng, and G. Yang, "Pedestrian Recognition and Tracking Using 3D LiDAR for Autonomous Vehicle", Robotics and Autonomous Systems, vol. 88, Feb. 2017, pp. 71-78.

D. Zermas, I. Izzat, and N. Papanikolopoulos, "Fast Segmentation of 3D Point Clouds: A Paradigm on LiDAR Data for Autonomous Vehicle Applications", IEEE International Conference on Robotics and Automation, 2017.

A. Petrovskaya and S. Thrun, "Model Based Vehicle Tracking for Autonomous Driving in Urban Environments", Robotics: Science and Systems, 2008.

A. Mousavian, D. Anguelov, J. Flynn, and J. Kosecka, "3D Bounding Box Estimation Using Deep Learning and Geometry", arXiv preprint arXiv: 1612.00496, Dec. 2016.

A. Geiger, P. Lenz, C. Stiller, and R. Urtasun, "Vision meets robotics: The KITTI dataset", The International Journal of Robotics Research, 32(11), 2013.

X. Chen, K. Kundu, Z. Zhang, H. Ma, S. Fidler, and R. Urtasun, "Monocular 3D Object Detection for Autonomous Driving", 2016 IEEE Conference on Computer Vision and Pattern Recognition (CVPR), pp. 2147-2156, Jun. 2016.

X. Chen, K. Kundu, Y. Zhu, H. Ma, S. Fidler and R. Urtasun, "3D Object Proposals Using Stereo Imagery for Accurate Object Class Detection", IEEE Transactions on Pattern Analysis and Machine Intelligence, vol. 40, No. 5, pp. 1259-1272, May 2018.

\* cited by examiner

ESTIMATING TWO-DIMENSIONAL OBJECT BOUNDING BOX INFORMATION BASED ON BIRD'S-EYE VIEW POINT CLOUD

CROSS-REFERENCE TO RELATED APPLICATIONS

The present application claims priority to U.S. Provisional Patent Application No. 62/728,504, filed Sep. 7, 2018, and titled "METHOD AND SYSTEM FOR ESTIMATING 2D OBJECT BOUNDING BOX FROM BIRD'S-EYE VIEW POINT CLOUD," the contents of which are hereby incorporated herein by reference.

FIELD

The present application relates generally to estimating two-dimensional object bounding box information and, more specifically, to estimating such bounding box information based on bird's eye view point cloud data.

BACKGROUND

Different types of sensors may be used to sense an environment surrounding the sensor. A processing unit may receive sensor data, acquired and provided by each different sensor, and process the sensor data to detect and identify objects of interest in the environment surrounding the sensor. The sensors may include, for example, detecting and ranging (DAR) sensors that use types of waves to sense an environment surrounding the sensor. Lidar sensors use light waves. Radar sensors use radio waves. Sonar sensors use sound waves. Autonomous vehicles often include one or more different types of ranging and detection sensors which are used to sense objects in an environment surrounding the vehicle. A DAR sensor, such as a lidar sensor, may provide sensor data that includes one or more sets of data points in the environment surrounding the sensor produced by the DAR sensor. Each set of data points in the environment surrounding the sensor produced by the DAR sensor is generally referred to as a three-dimensional (3D) point cloud. Each set of data points (e.g., each 3D point cloud) represents a three-dimensional (3D) object in the environment the sensor. In some applications, in addition to detecting and identifying objects of interest in the environment surrounding the sensor, the processing unit may perform "bounding box estimation," using each 3D point cloud. Recently, there has been increasing attention paid to two-dimensional (2D) bounding box estimation and L-shape fitting based on bird's-eye view (top-down) 2D point cloud obtained from a 3D point cloud.

BRIEF DESCRIPTION OF THE DRAWINGS

Reference will now be made, by way of example, to the accompanying drawings which show example implementations; and in which.

Similar reference numerals may be used in different figures to denote similar components.

DETAILED DESCRIPTION

Current 2D bounding box estimation methods are known to rely upon directly assessing a set of 2D data points (a 2D point cloud) for an object. The result of the assessing may be a rectangle that tightly embraces all points in the set of 2D data points. In the case of so-called "L-shape" estimation, if the data points define two clear observable edges, then it is feasible to use those data points to estimate a 2D bounding box for the object.

Notably, the 2D point cloud for a given object may be characterized as being incomplete or sparse, such that only a part of the given object can be observed from the 2D point cloud. An incomplete set of data points (e.g., a sparse 2D point cloud) could, for example, result from occlusion, viewing angle limitations or DAR sensor limitations. The DAR sensor limitations may be caused, for example, by attempting to sense the given object although the given object is a relatively long distance away from the DAR sensor. In cases where the data points of a 2D point cloud only partially represent a target object, the estimated bounding box is unlikely to accurately represent the target object.

Figure 1:
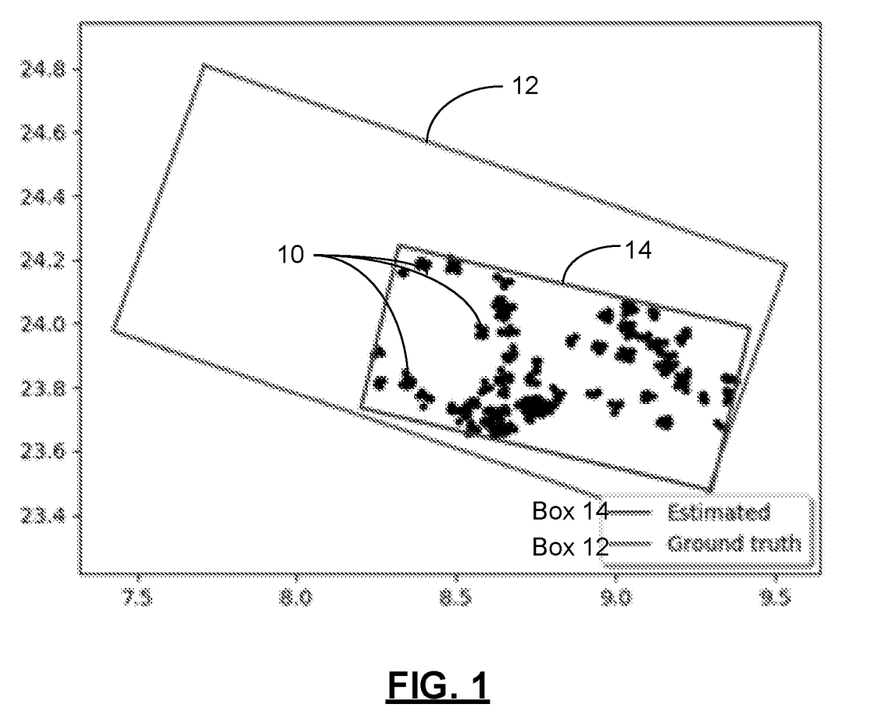
FIG. 1 illustrates inaccurate estimation of a bounding box by a conventional methods.

An example of the problem wherein the data points of a point cloud only partially represent a target object is illustrated in FIG. 1. FIG. 1 illustrates an incomplete or sparse set 10 of two-dimensional data points provided by a lidar sensor in respect of a detected object that has an actual (ground truth) outer boundary as indicated by a first rectangular box 12. As shown in FIG. 1, a problem, such as the object being partially obscured, has resulted in the generation of the incomplete or sparse set 10 of data points for the object. A second rectangular box 14 is illustrated representative of a bounding box inaccurately estimated for the object as a result of the incomplete or sparse set 10 of data points.

Aspects of the present application relate to a bounding box estimator that is configured to receives a set of unordered 2D data points representing a projection of 3D point cloud to a bird's eye view (BEV) of the space surrounding the DAR sensor that includes a given object, and generate a 2D object bounding box (e.g., a 2D object bounding box vector) for the given object. In example embodiments, the bounding box estimator includes a two neural networks that learn to estimate dimensions, position and orientation for a 2D object bounding box based on 2D point clouds of various objects. The neural networks included in the bounding box estimator, may, initially, be trained together to adjust weights or biases of the neural network until an overall loss function is optimized and later, in use, may be employed to generate 2D bounding boxes from sets of unordered 2D data points as described in further detail below.

Aspects of the present application relate to using a deep neural network to estimate features of a bounding box for an object responsive to being given 2D point cloud for the object. Conveniently, the training of the deep neural network provides the deep neural network with prior knowledge of the objects for which bounding box estimation is likely to be performed. For example, based on training, the deep neural network may be familiar with estimating a bounding box for a car. It follows that, even when a 2D point cloud is only representative of, say, a hood and a front windshield of a car, aspects of the present application will be able to estimate a bounding box for the entirety of the car.

According to an aspect of the present disclosure, there is provided a method for estimating 2D object bounding box (e.g. 2D object bounding box vectors) for objects. The method includes receiving, at a bounding box estimator, a 3D point cloud that is representative of a particular object; processing, at the bounding box estimator, the 3D point cloud to generate a set of unordered two-dimensional data points, the set of unordered two-dimensional data points representing a projection of 3D point cloud to a bird's eye view (BEV) of the space surrounding the DAR sensor that includes the particular object; and generating, by the bounding box estimator, a bounding box vector for the object. The bounding box vector includes: a value representative of a width for a bounding box for the object; a value representative of a length for the bounding box; a value representative of an orientation angle for the bounding box; and values representative of a center for the bounding box.

According to another aspect of the present disclosure, there is a processing unit. The processing unit includes electronic storage storing computer-readable instructions defining a bounding box estimator and a processor configured to execute the computer-readable instructions to: receive sensor data provided by a detection and ranging (DAR) sensor, the sensor data comprising a 3D point cloud that is representative of a particular object; process the sensor data to generate one or more sets of unordered two-dimensional data points, each set of unordered two-dimensional data points representing a projection of 3D point cloud to a bird's eye view (BEV) of the space surrounding the DAR sensor that includes the particular object; and generate an estimated bounding box vector for the object. The bounding box vector includes: a value representative of a width for the bounding box; a value representative of a length for the bounding box; a value representative of an orientation angle for the bounding box; and values representative of a center for the bounding box.

Although aspects of the present application are described herein in the context of the use of deep neural networks, it should be clear to those of ordinary skill in the art that deep neural networks are not the only kind of neural networks that may be used. The primary condition to be met is consistency of input and output interfaces with the data formats described herein. Indeed neural networks may be seen to make up a subset of machine learning approaches to bounding box estimation.

Other aspects and features of the present disclosure will become apparent to those of ordinary skill in the art upon review of the following description of specific implementations of the disclosure in conjunction with the accompanying figures.

Some examples of the present disclosure are described in the context of autonomous vehicles. However, aspects of the present application may also be suitable for implementation outside of autonomous devices. That is aspects of the present application may also be suitable for implementation in non-vehicular devices and non-autonomous devices. For example, any machine learning based system or device that performs object detection and bounding box estimation may benefit from aspects of the present application. Further, aspects of the present application may also be suitable for implementation in image processing devices, such as workstations or other computing devices not related to autonomous machines (e.g., image processing workstations for analyzing radar data or ultrasound data).

Although examples described herein may refer to a car as the autonomous vehicle, the teachings of the present disclosure may be implemented in other forms of autonomous or semi-autonomous vehicles including, for example, trams, subways, trucks, buses, surface and submersible watercraft and ships, aircraft, drones (also called unmanned aerial vehicles or "UAVs"), warehouse equipment, construction equipment or farm equipment, and may include vehicles that do not carry passengers as well as vehicles that do carry passengers. Example non-vehicular devices for which aspects of the present application may be suitable for implementation include, for example, autonomous vacuum cleaners and autonomous lawn mowers.

Figure 2:
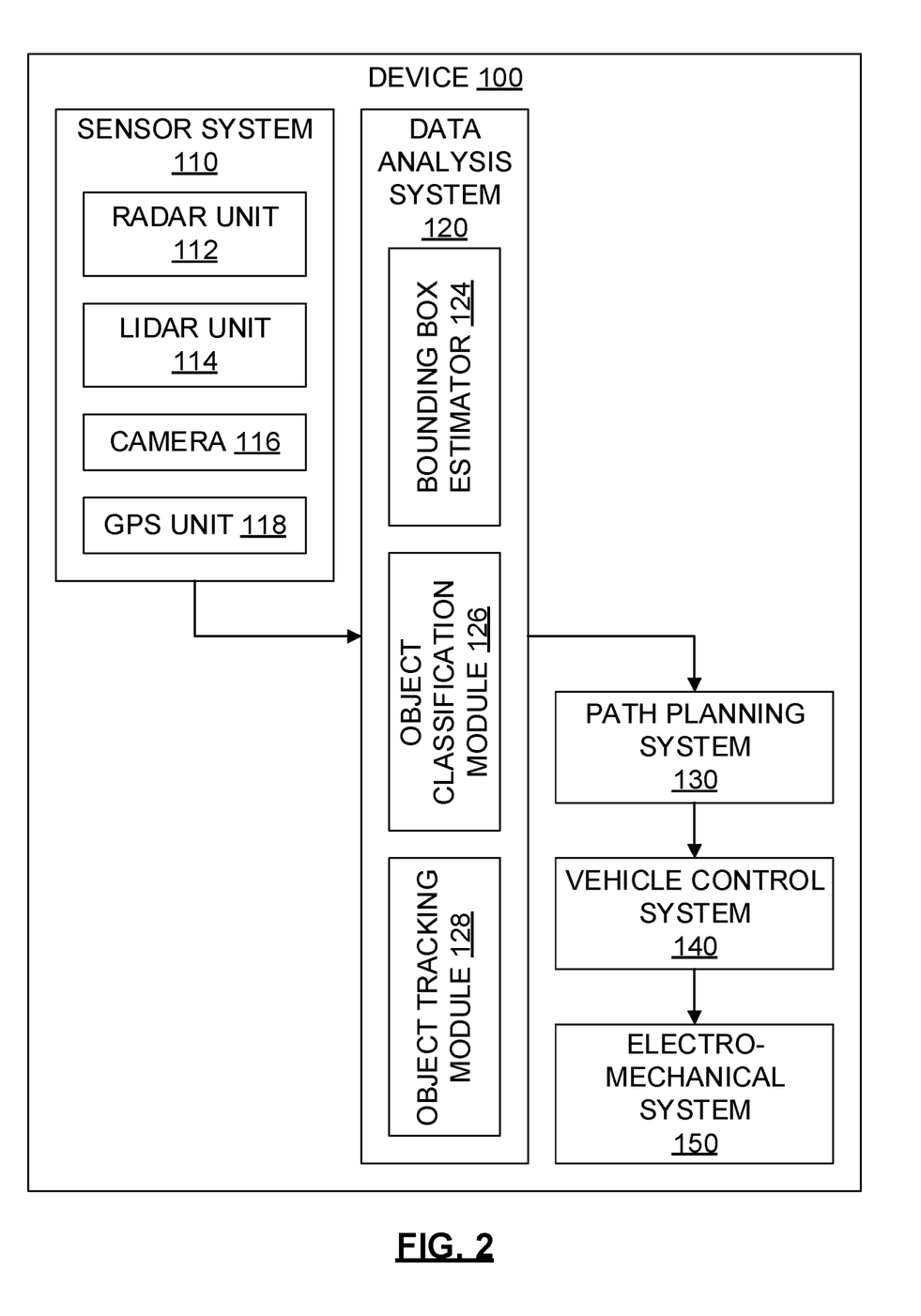
FIG. 2 is a block diagram illustrating some components of an example autonomous vehicle, in accordance with aspects of the present application.

FIG. 2 illustrates, as a block diagram, various components of an example autonomous vehicle 100. Although described as being autonomous, the vehicle 100 may be operable in a fully-autonomous, semi-autonomous or fully user-controlled mode. In the present disclosure, the vehicle 100 is described as being embodied as a car. However, aspects of the present application may be implemented in other vehicular or non-vehicular machines, as discussed hereinbefore.

The example vehicle 100 of FIG. 2 includes a sensor system 110, a data analysis system 120, a path planning system 130, a vehicle control system 140 and an electro-mechanical system 150. Other systems and components may be included in the vehicle 100, as appropriate. Various systems and components of the vehicle 100 may communicate with each other through, for example, wired communication or wireless communication. For one example, the sensor system 110 may communicate with the data analysis system 120, the path planning system 130 and the vehicle control system 140; the data analysis system 120 may communicate with the path planning system 130 and the vehicle control system 140; the path planning system 130 may communicate with the vehicle control system 140; and the vehicle control system 140 may communicate with the mechanical system 150.

The data analysis system 120, the path planning system 130 and the vehicle control system 140, in the example embodiment shown in FIG. 2, are distinct software systems that may be implemented on one or more hardware devices configured to execute instructions or processes of the software systems, such as a processing unit, an application-specific integrated circuit (ASIC), a field-programmable gate array (FPGA) and/or other types of hardware devices. For example, the data analysis system 120, the planning system 130 and the vehicle control system 140 may be implemented on a single hardware device. Alternatively, two of the data analysis system 120, the planning system 130 and the vehicle control system 140 may be implement on a first hardware device and the other one of the planning system 130 and the vehicle control system 140 may be implemented on a second distinct hardware device. Alternatively, each of the data analysis system 120, the planning system 130 and the vehicle control system 140 may be implemented on a different hardware devices. FIG. 2 illustrates an example flow of data (indicated by arrows) from the sensor system 110 to the data analysis system 120, to the planning system 130, to the vehicle control system 140 and, finally, to the electromechanical system 150 (discussed in further detail below). However, it should be understood that data may be communicated among the systems 110, 120, 130, 140, 150 in various different ways, and there may be two-way data communication among the systems 110, 120, 130, 140, 150.

The sensor system 110 includes various sensing units adapted for collecting information about the internal environment of the vehicle 100 and/or the external environment of the vehicle 100. In the example shown, the sensor system 110 includes a radar unit 112, a lidar unit 114, a camera 116 and a global positioning system (GPS) unit 118. The sensor system 110 may include other sensing units, such as a temperature sensor, a precipitation sensor or a microphone, among other possibilities.

In example embodiments, the lidar unit 114 may include one or more lidar sensors (not shown). The lidar sensor(s) may scan the external environment of the vehicle 100 in a wide angle view (e.g., a 360° angle view) to capture information about objects in the environment surrounding the vehicle 100. The lidar sensor(s) captures three-dimensional (3D) information about object(s) detected in the environment, and may process the 3D information to form a set of data points in 3D space representative of the object(s) in the environment. Notably, a set of data points in 3D space may be referred to hereinafter as a 3D point cloud. Each data point in the 3D point cloud may be considered to be characterized by values for three coordinates (e.g., x, y, z) of a sensed point on an object in 3D space. As is known, the set of data points in the 3D point cloud may be irregularly spaced, with spacing that depends on the environment that is being sensed. In some examples, in addition to coordinates, each data point in the 3D point cloud may also contain other information. In one example, the other information is a value representative of an intensity of reflected light. In another example, the other information is a value representative of time of detection. The lidar unit 114 provides sensor data comprising the 3D point cloud(s) provided by the lidar sensor(s).

Using the various sensing units 112, 114, 116, 118, the sensor system 110 may collect information about the local environment of the vehicle 100 (e.g., any immediately surrounding obstacles) as well as information from a wider vicinity (e.g., the radar unit 112 and lidar unit 114 may collect information from an area in a 100 m radius around the vehicle 100). The sensor system 110 may also collect information about the position and orientation of the vehicle 100 relative to a frame of reference (e.g., using the GPS unit 118). The sensor system 110 provides the collected information in the form of sensor data.

The sensor system 110 communicates with the data analysis system 120 to provide sensor data, which is processed to detect and identify objects in the surrounding environment of the vehicle 100. For example, the sensor system 110 may provide sensor data comprising images provided by the camera unit 116 or 3D point clouds provided by the radar unit 112 and/or the lidar unit 114. Example objects include a stationary obstacle, a pedestrian and another vehicle. The data analysis system 120 may process the sensor data received from the sensor system 110, using any suitable analysis approach. Example suitable analysis approaches include those techniques and algorithms well known in the field of computer vision.

The data analysis system 120 may be implemented using software, which may include any number of algorithm-implementing modules and functions. Such modules and functions may be independent or interconnected. The modules may, for example, implement machine learning algorithms. The functions may, for example, implement known image processing functions. The data analysis system 120 may be implemented using one or more dedicated image processing hardware units or may be implemented using one or more general processing hardware units of the vehicle 100.

The data analysis system 120 may repeatedly (e.g., in regular intervals) receive sensor data from the sensor system 110. Responsive to receiving the sensor data, the data analysis system 120 may perform image analysis. The speed with which the data analysis system 120 performs the image analysis may lead to results being available with a promptness that may be classified as real-time or near real-time.

The output of the data analysis system 120 may include, for example, identification of a given object. The identification of the given object may, for example, include an indication of an object class for the given object, indicating an object location for the given object and indicating an object boundary, in 2D space and/or 3D space, for the given object.

Included among the modules of the data analysis system 120, in the vehicle 100 of FIG. 2, is a bounding box estimator 124. The bounding box estimator 124 is configured, according to aspects of the present application, to estimate a 2D object bounding box from bird's eye view 2D point cloud representative of an object. The bounding box estimator 124 will be described in greater detail hereinafter.

In overview, the bounding box estimator 124 generates a "bounding box" from a "3D point cloud" that is representative of an object. The bounding box estimator 124 includes two neural networks: a first neural network configured for feature extraction; and a second neural network configured for bounding-box regression. In embodiment described here, a DAR sensor, such as a radar sensor 112 of the radar unit or a lidar sensor of the lidar unit 114, provides a sensor data that includes a "point cloud" that is a result of scan of an environment surrounding the vehicle 100. This "point cloud" can include one or more objects. The data analysis system 120 performs clustering and segmentation on the "point cloud" to generate distinct "3D point clouds" that are representative of each particular object in the "point cloud" that is a result of scan of an environment surrounding the vehicle 100. Each distinct "3D point cloud" that is representative of a particular object is then input to the bounding box estimator 124.

Sensor data generated by the sensor system 110 may be provided to the path planning system 130. Sensor data received by the path planning system 130 may be used to generate target objectives. The vehicle control system 140 serves to control operation of the vehicle 100 based on the target objectives generated by the path planning system 130. The vehicle control system 140 may be used to provide control signals allowing for full, partial or assistive control of the vehicle 100. The electromechanical system 150 receives the control signals from the vehicle control system 140 and, based on the control signals, may act to operate electromechanical components of the vehicle 100. Such electromechanical components of the vehicle 100 may include an engine (not shown), a transmission (not shown), a steering system (not shown) and a braking system (not shown).

Figure 3:
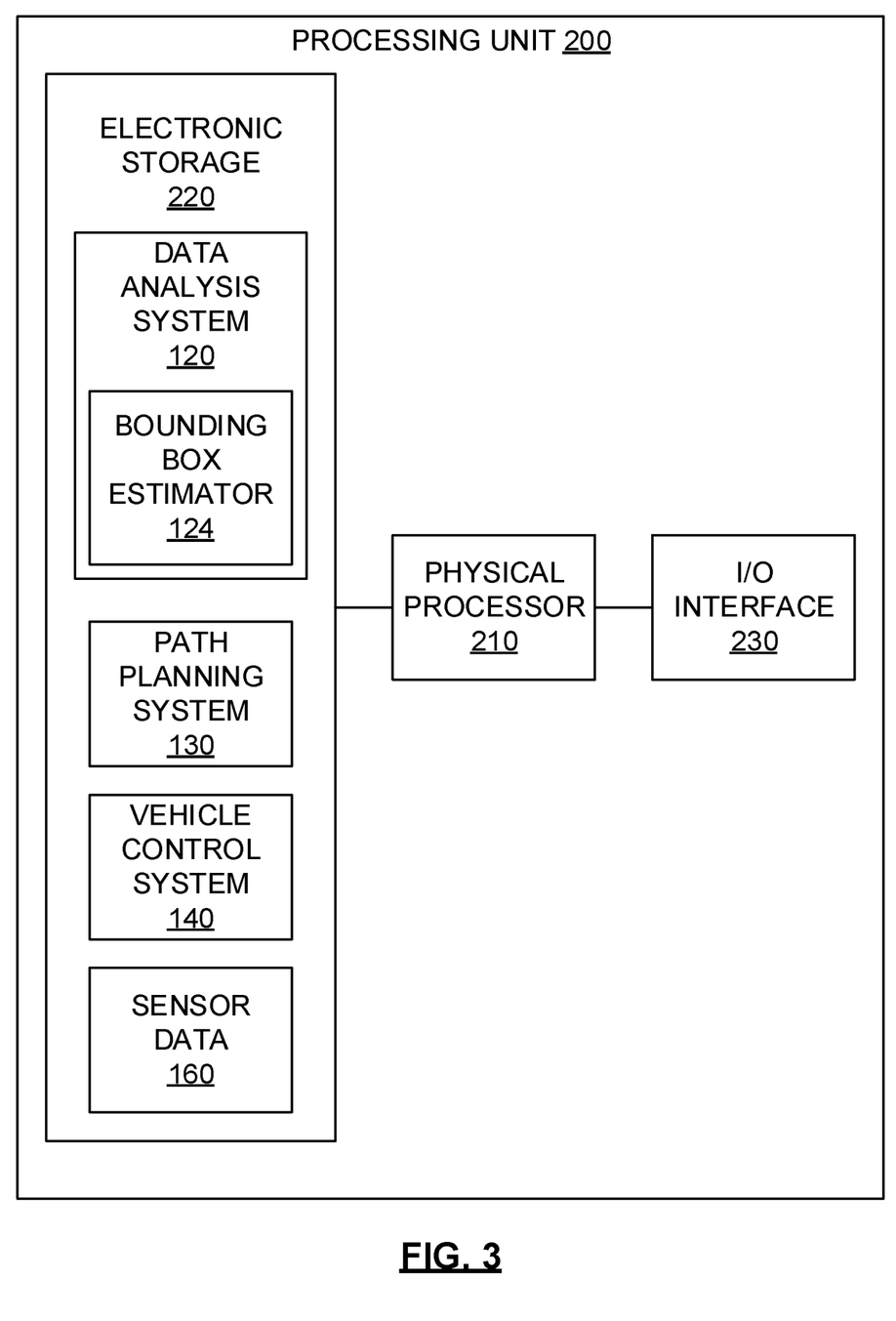
FIG. 3 is block diagram illustrating some components of a processing system used to implement a bounding box estimator, in accordance with aspects of the present application.

The sensor system 110, the data analysis system 120, the path planning system 130 and the vehicle control system 140 may be, individually or in combination, realized, at least in part, in one or more processing units of the vehicle 100. By way of example, FIG. 3 illustrates an example of a processing unit 200 of the vehicle 100. The processing unit 200 is illustrated as including a physical processor 210. Although a single physical processor 210 is illustrated, the processing unit 200 may include a plurality of physical processors 210.

The physical processor 210 may, for example, be a microprocessor, a central processing unit, a graphical processing unit, a tensor processing unit, a digital signal processor or another computational element.

The physical processor 210 is illustrated coupled to an electronic storage 220. The electronic storage 220 may include transitory memory (not shown). The transitory memory may include, for example, so-called "flash" memory. The electronic storage 220 may include non-transitory memory (not shown), for example, so-called Random Access Memory (RAM). The transitory memory of the electronic storage 220 may store instructions, data and/or software modules for execution by the physical processor 210 to carry out the functions of the systems described herein. The transitory memory portion of the electronic storage 220 may store other software instructions and data for implementing other operations of the vehicle 100. The electronic storage 220 may include any suitable volatile and/or non-volatile storage and retrieval devices. The electronic storage 220 may include one or more of RAM, read only memory (ROM), hard disk, optical disc, subscriber identity module (SIM) card, memory stick, secure digital (SD) memory card and the like.

The electronic storage 220 is illustrated, in FIG. 3, as storing instructions for the data analysis system 120, the path planning system 130, the vehicle control system 140 and sensor data 160. Conveniently, aspects of the present application contemplate that the bounding box estimator 124 will not always be operating upon data directly received from the lidar unit 114 in the sensor system 110. Indeed, environment data may be non-contemporaneously collected and stored in the electronic storage 220 as the sensor data 160.

The physical processor 210 is illustrated as coupled to an input/output (I/O) interface 230. Although only one I/O interface 230 is illustrated, a plurality of I/O interfaces and devices may be included in the processing unit 200.

In the example of FIG. 3, the instructions and the data that are stored in the electronic storage 220 of the processing unit 200 enable the processor 210 to implement the bounding box estimator 124. The bounding box estimator 124 may be considered to perform a sub-module or subsystem of the data analysis system 120. The bounding box estimator 124 provides 2D bounding box vectors that can be stored in the electronic storage 220 and used by the data analysis system 120 or the path planning system 130. The output of the object classification module 126 and the object tracking module 128 may provide further input data for the path planning system 130.

In example embodiments, the bounding box estimator 124 receives a 3D point cloud that is representative of a particular object, transforms the 3D point cloud to a set of unordered 2D data points representing a projection to the 2D bird's-eye view (BEV) of an environment or space sensed by the DAR sensor, generates an estimated 2D bounding box, including size and pose of the particular object, relative to a coordinate system of the DAR sensor (such as the coordinate system of the lidar unit 114 or the coordinate system of the radar unit 112), and output the estimated 2D bounding box. The bounding box estimator 124 includes, in accordance with aspects of the present application, a first neural network configured for feature extraction and second neural network configured for bounding box regression that are trained together learn to estimate a 2D bounding box, including size and pose, of an object from any set of unordered 2D data points representing a projection to a 2D BEV of a sensed environment or space that includes the object. The first and second neural networks are trained together using a training dataset comprising sets of unordered 2D data points to obtain an estimated 2D bounding box, including size and pose, for each given object. In training, each set of unordered 2D data points represents a projection to 3D point cloud to a 2D BEV of a sensed environment or space that includes a given object and actual 2D BEV dimensions and orientation for each given object in the training dataset is compared against the output of the second neural network of the bounding box estimator. The first and second neural networks are trained together to learn parameters (e.g., weights and biases) of the first and second neural networks until a loss function of the bounding box estimator is optimized.

Figure 4:
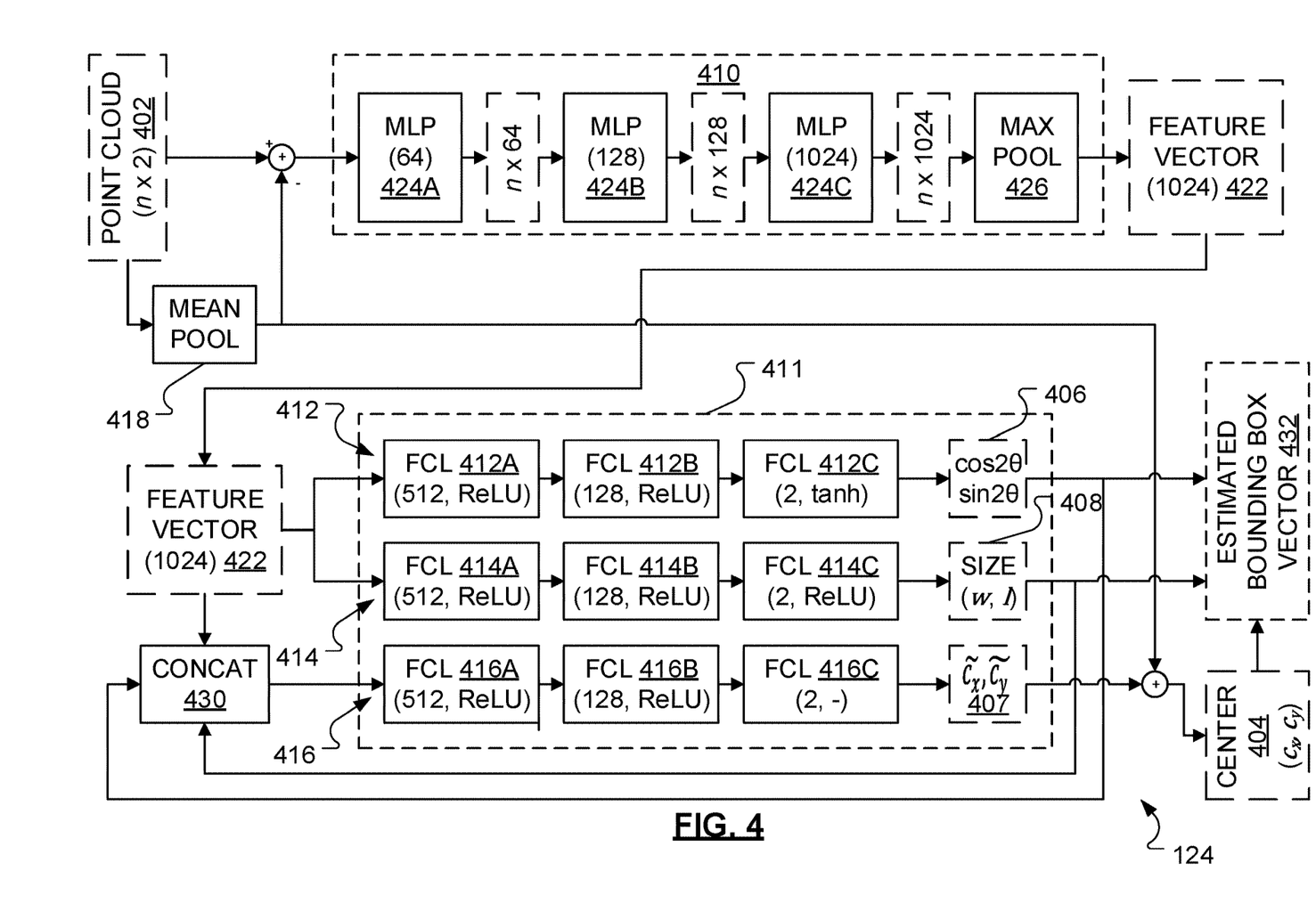
FIG. 4 is a block diagram showing logical components of a bounding box estimator, in accordance with aspects of the present application.

FIG. 4 illustrates, as a block diagram, an example logical architecture for the bounding box estimator 124 according to an example embodiments. Although not illustrated, it may be understood that there exists a function for transforming the 3D point cloud of size n that is representative of an object to the set 402 of unordered 2D data points. Hence, in this example embodiment, the input to the bounding box estimator 124 is a 3D point cloud of size n (e.g. a 3D point cloud includes n data points that is representative of a particular object). The set 402 of unordered 2D data points includes n data points and is representative of a projection of a 3D point cloud to a 2D BEV of an environment or space sensed by the DAR sensor. Each data point in the set 402 of unordered 2D data points is represented as a 2D BEV coordinate (x, y), such that the set 402 of unordered 2D data points may be represented as an input vector having 2n values: n values of x coordinates; and n values of y coordinates. In this regard, the vertical axis (z) coordinate of a set of 3D data points having x, y and z coordinates is effectively ignored, such that each data point of the set 402 of 2D data points represents a point in an artificial, horizontal, two-dimensional space as viewed from directly above. Notably, rather than receiving and transforming a 3D point cloud "in the moment," the bounding box estimator 124 may access the set 402 of unordered 2D data points as a set that have been previously received and transformed and stored as the sensor data 160 (see FIG. 3). Furthermore, the sensor data 160 may be periodically updated. It will be appreciated that in alternative example embodiments, the function for transforming the 3D point cloud of size n that is representative of an object (e.g., a 3D point cloud comprising n data points) to the set 402 of unordered 2D data points may be excluded from the bounding box estimator 124 and included in the data analysis system 120.

The output of the bounding box estimator 124 is an estimated bounding box vector $[c_x, c_y, w, l, \cos 2\theta, \sin 2\theta]^T$ 432, which includes parameters estimating a bounding box for an object within the space as follows: an absolute box center vector $(c_x, c_y)$ 404 for the bounding box; a size vector (w, l) 408 of the bounding box in two dimensions, where w and l represent bounding box width and length respectively; and a bounding box orientation angle vector $[\cos 2\theta, \sin 2\theta]^T$ 406 that represents an orientation of the bounding box. An orientation angle, $\theta$, of the bounding box relative to the lidar coordinate system can be recovered from the bounding box orientation angle vector $[\cos 2\theta, \sin 2\theta]^T$ 406.

In the example of FIG. 4, the bounding box estimator 124 includes a two neural networks and additional functions. The bounding box estimator 124 receives a set of unordered 2D data points and outputs the estimated bounding box vector $[c_x, c_y, w, l, \cos 2\theta, \sin 2\theta]^T$ 432. The first neural network 410 is configured for feature extraction and a second neural network 411 is configured for bounding box regression. Example architectures of each of the first and second neural networks 410, 411, may be considered in view of the following. In accordance with aspects of the present application, each of the first and second neural networks 410, 411 are deep neural networks.

The additional functions of the bounding box estimator 124 includes a mean pool function 418 which determines the mean, $\bar{x}$, of the x coordinate values and the mean, $\bar{y}$, of the y coordinate values for the set 402 of unordered 2D data points, thereby giving a point cloud mean, $(\bar{x}, \bar{y})$. At a subtraction function 420, the point cloud mean, $(\bar{x}, \bar{y})$, is subtracted from each of the n data points of the input set 402 of unordered 2D data points, thereby giving a set of n mean-reduced data points with 2n mean-reduced values. The additional functions of the bounding box estimator 124 also include a subtraction function 420 which passes the 2n mean-reduced values into the first neural network 410 configured for feature extraction. The output of the first neural network 410 is a feature vector 422.

In the embodiment illustrated in FIG. 4, the first neural network 410 configured for feature extraction includes a plurality of successive multi-layer perceptrons (MLP) 424: a first MLP 424A; a second MLP 424B; and a third MLP 424C. The plurality of successive MLPs 424 is followed by a maximum pooling function 426.

As is known, a generic MLP has nodes. A node is a computational unit that has one or more input connections, each input connection associated with a respective weight or bias, a transfer function that combines the inputs in some way and an output connection. The nodes may also be called neurons, thereby leading to the name "neural network." The nodes are arranged within the generic MLP in layers: an input layer; one or more hidden layers; and an output layer. The MLPs 424 of the first neural network 410 are each defined by their number of nodes in their respective input/output layers. For example, the first MLP 424A is characterized as having 64 nodes. Accordingly, the first MLP 424A has 64 nodes in its input layer and 64 nodes in its output layer. Similarly, the second MLP 424B has 128 nodes in its input layer and 128 nodes in its output layer. Further, the third MLP 424C has 1024 nodes in its input layer and 1024 nodes in its output layer.

Although a number of different architectures can be used to implement the first neural network 410 configured for feature extraction, in the illustrated, non-limiting example of FIG. 4, the number of MLPs 424 is three and the number of nodes characterizing an MLP increases for each subsequent MLP in the first neural network 410; from 64 nodes to 128 nodes to 1024 nodes.

The first MLP 424A includes 64 nodes. Each of the 64 nodes in the input layer of the first MLP 424A is connected to receive, as inputs, all 2n of the mean-reduced values. Each of the 64 MLP nodes produces n values as outputs.

The second MLP 424B includes 128 MLP nodes. Each of the 128 MLP nodes is connected to receive, as inputs, all 64n values output from first MLP 424A. Each of the 128 MLP nodes produces n values as outputs.

The third MLP 424C includes 1024 MLP nodes. Each of the 1024 MLP nodes is connected to receive, as inputs, all 128n of the values from the second MLP 424B. Each of the 1024 MLP nodes produces n values as outputs. That is, each of the 1024 MLP nodes in the third MLP 424C produces a column of n values, such that 1024 columns of values are output from the third MLP 424C.

The maximum pooling function 426 selects the maximum value in each of the 1024 columns to generate the extracted feature vector 422 having 1024 values. In summary, in the example of FIG. 4, the various MLPs 424 (with 64 nodes, 128 nodes, 1024 nodes) in combination with the maximum pooling function 426 allow the first neural network 410 to generate the extracted feature vector 422 of size 1024.

The first neural network 410 may be implemented in a manner familiar from aspects disclosed in "PointNet," created by Charles R. Qi, Hao Su, Kaichun Mo, and Leonidas J. Guibas from Stanford University. PointNet code may be found at github.com/charlesq34/pointnet.

The extracted feature vector 422 is used as an input for the second neural network 411 for bounding box regression. The second neural network 411 includes three sub-networks 412, 414 and 416. The orientation-estimating sub-network 412 is configured to estimate the bounding box orientation angle vector $[\cos 2\theta, \sin 2\theta]^T$ 406. The size-estimating sub-network 414 is configured to estimate the bounding box size vector (w, l) 408. The center-estimating sub-network 416) is configured to determine an estimated center vector $(\widetilde{c_x}, \widetilde{c_y})$ 407 of the estimated object bounding box relative to the point cloud mean, $(\bar{x}, \bar{y})$, of the point cloud. Accordingly, the second neural network 411 for bounding box regression outputs the vector: $[\widetilde{c_x}, \widetilde{c_y}, w, l, \cos 2\theta, \sin 2\theta]^T$.

As shown in FIG. 4, each of the sub-networks 412, 414, 416 of the second neural network 411 for bounding box regression includes multiple fully connected layers (FCLs). In the example illustrated in FIG. 4, each sub-network 412, 414, 416 includes the same number (3) of levels of FCL as the other sub-networks 412, 414, 416. An FCL may be characterized by a number of nodes. In the example illustrated in FIG. 4, an FCL in one of the sub-networks 412, 414, 416 includes the same number of nodes as an FCL at the corresponding level in the other two of the sub-networks 412, 414, 416.

In a manner consistent with the arrangement of the MLPs 424, a generic FCL is arranged in a series of layers of nodes: an input layer; one or more hidden layers; and an output layer. In an FCL, every node in one layer is connected to every node in the next layer in the series.

In the non-limiting example shown in FIG. 4, each sub-network 412, 414, 416 includes three FCL levels. A first FCL 412A in the first level of the orientation-estimating sub-network 412 has 512 nodes. Similarly, a first FCL 414A in the first level of the size-estimating sub-network 414 has 512 nodes and a first FCL 416A in the first level of the center-estimating sub-network 416 has 512 nodes. A second FCL 412B in the second level of the orientation-estimating sub-network 412 has 128 nodes. Similarly, a second FCL 414B in the second level of the size-estimating sub-network 414 has 128 nodes and a second FCL 416B in the second level of the center-estimating sub-network 416 has 128 nodes. A third FCL 412C in the third level of the orientation-estimating sub-network 412 has two nodes. Similarly, a third FCL 414C in the third level of the size-estimating sub-network 414 has 2 nodes and a third FCL 416C in the third level of the center-estimating sub-network 416 has 2 nodes.

For all three sub-networks 412, 414, 416, an activation function applied at the nodes of the first level and the second level is a Rectified Linear Unit ("ReLU") activation function. Notably, the activation function in the third FCL 412C in the third level of the orientation-estimating sub-network 412 is distinct from the activation function in the third FCL 414C in the third level of the size-estimating sub-network 414 and both of those activation functions are distinct from the activation function in the third FCL 416C in the third level of the center-estimating sub-network 416.

The two nodes of the third FCL 412C of the orientation-estimating sub-network 412 use tan h activation functions to output estimated values for box orientation angle vector [cos 2θ, sin 2θ]$^T$ 406. The two nodes of the third FCL 414C of the size-estimating sub-network 414 use ReLU activation functions to output estimated values for bounding box size vector (w, l) 408. The two nodes of the third FCL 416C of the center-estimating sub-network 416 use a linear activation functions to output the estimated center vector ($\widetilde{c_x}, \widetilde{c_y}$) 407.

In the examples described above, the orientation-estimating sub-network 412 outputs estimated values for box orientation angle vector [cos 2θ, sin 2θ]$^T$ 406 rather than directly output the orientation angle θ of a 2D bounding box. It is difficult to train a neural network to directly estimate the orientation angle θ of a 2D bounding box due to angle discontinuity $$at = \pm \frac{\pi}{2}.$$

To address this issue, the orientation-estimating sub-network 412 is trained to learn sin 2θ, which is continuous at $$\theta = \pm \frac{\pi}{2}.$$

Although learning sin 2θ solves the discontinuity problem, it is not sufficient to uniquely estimate the orientation angle θ. Clearly, both $$\theta = \frac{\pi}{4} - \varepsilon \text{ and } \theta = \frac{\pi}{4} + \varepsilon$$

yield the same value for sin 2θ, if $$0 < \theta < \frac{\pi}{4}.$$

Accordingly, to get a unique value for the orientation angle θ of a 2D bounding box, the orientation-estimating sub-network 412 is configured to learn both sin 2θ and cos 2θ. In example embodiments, the function $$\theta = \frac{\arctan\left[\frac{\sin 2\theta}{\cos 2\theta}\right]}{2}$$

is applied to obtain the orientation angle θ of a 2D bounding box from the box orientation angle vector [cos 2θ, sin 2θ]$^T$ 406.

With respect to the estimation of bounding box size vector (w, l) 408 by the size-estimating sub-network 414, a learning-based bounding box fitting method has the capacity to learn object size from training data. To guarantee that the output of the size-estimating sub-network 414 is always positive, "ReLU" is used as the activation function for the nodes in the third FCL 414C of the size-estimating sub-network 414.

As indicated in FIG. 4, in example embodiments, the box orientation angle vector [cos 2θ, sin 2θ]$^T$ 406 and the bounding box size vector (w, l) 408, which vectors are estimated by the orientation-estimating sub-network 412 and the size-estimating sub-network 414, respectively, are concatenated, at a concatenation function 430, with the extracted feature vector 422 to generate a concatenated vector. The concatenated vector is used as the input for the center-estimating sub-network 416, which outputs the estimated center vector ($\widetilde{c_x}, \widetilde{c_y}$) 407.

Notably, the first FCL 412A in the orientation-estimating sub-network 412 and the first FCL 414C in the size-estimating sub-network 414 each receive, as input, a 1024-value feature vector. In contrast, the first FCL 416A in the center-estimating sub-network 416 receives, as input, a 1028-value input vector comprising the 1024-value feature vector in combination with the two values in the estimated box orientation angle vector [cos 2θ, sin 2θ]$^T$ 406 at the output of the third FCL 412C of the orientation-estimating sub-network 412 and the two values in the bounding box size vector (w, l) 408 at the output of the third FCL 414C of the size-estimating sub-network 414.

This is done to take advantage of a high correlation of the estimated center vector ($\widetilde{c_x}, \widetilde{c_y}$) 407 with the estimated box orientation angle vector [cos 2θ, sin 2θ]$^T$ 406 and the bounding box size vector (w, l) 408. As noted above, the estimated center vector ($\widetilde{c_x}, \widetilde{c_y}$) 407 output by the third FCL 416C of the center-estimating sub-network 416 is relative to the point cloud mean ($\bar{x}, \bar{y}$) of the set 402 of unordered 2D data points. This is caused by the fact that the point cloud mean ($\bar{x}, \bar{y}$) was subtracted from each of the data points of the set 402 of unordered 2D data points prior to generating the extracted feature vector 422. Accordingly, in example embodiments, the absolute box center vector ($x_x, c_y$) 404 is obtained by adding, at an adder function 428, the point cloud mean ($\bar{x}, \bar{y}$) to the estimated center vector ($\widetilde{c_x}, \widetilde{c_y}$) 407.

As noted above, the point cloud mean ($\bar{x}, \bar{y}$) of the set 402 of unordered 2D data points was subtracted from each of the input data points prior to generating the extracted feature vector 422. Simulation results indicate that providing mean-reduced data points as input to the deep leaning neural network of the bounding box estimator 124 can improve learning on the part of the deep leaning neural network. In some examples, a point cloud median could be used in place of the point cloud mean. In some examples, the 2D BEV input cloud points could be used to determine the extracted feature vector 422 without any mean or medium reduction, in which case the absolute center estimate would be output directly from the center-estimating sub-network 416.

Before a neural network can be successfully deployed, the neural network must be trained. In general, training a neural network involves providing, to the neural network, a set of data for which a desired result of processing the set of data with the neural network is known. The first and second neural network 410, 411 of the bounding box estimator 124 of FIG. 4 are trained together using a training dataset comprising sets of unordered 2D data points. The sets of unordered 2D data points may be generated from a set of 3D point clouds in which each 3D point cloud in the set is representative of a known object. Each 3D point cloud in the set is transformed to a set of unordered 2D data points for which 2D bounding box vectors are known.

One example of a set of 3D point clouds in which each 3D point cloud represents an object may be found in the KITTI Vision Benchmark Suite, which is a project of Karlsruhe Institute of Technology and the Toyota Technological Institute at Chicago. The KITTI Vision Benchmark Suite includes a KITTI 3D object dataset, which is known to contain thousands of lidar and camera frames that are well calibrated and synchronized.

Training neural networks may be based on a sequence that involves stages known as Feedforward, Loss and Backpropagation.

In view of FIG. 4, training the bounding box estimator 124 of FIG. 4 may involve, for a 3D point cloud (e.g. the set of 3D data points) that is representative of a particular object in the KITTI 3D object dataset for which a known bounding box vector (i.e., a ground truth bounding box) exists, transforming the 3D point cloud to the set 402 of unordered 2D data points. In the Feedforward stage, the set 402 of unordered 2D data points is input into the first neural network 410 of the bounding box estimator 124. The output of the second neural network 411 of the bounding box estimator 124 is the estimated bounding box vector $[c_x, c_y, w, l, \cos 2\theta, \sin 2\theta]^T$ 432.

In the Loss stage, a determination may be made as to the accuracy of the estimated bounding box vector $[c_x, c_y, w, l, \cos 2\theta, \sin 2\theta]^T$ 432 output from the bounding box estimator 124 relative to the known bounding box vector.

According to aspects of the present application, an overall loss function for use in training the first and second neural networks 410, 411 of the bounding box estimator 124 together may be defined as:

$$\text{loss} = w_\theta * L_\theta + w_{w,l} * L_{w,l} + w_c * L_c$$

where $L_\theta$ is a loss function for the orientation-estimating sub-network 412, $L_{w,l}$ is a size loss function for the size size-estimating sub-network 414, $L_c$ is a loss function for the center-estimating size-estimating sub-network 416, and $w_\theta$, $w_{w,l}$, $w_c$ are loss weights. Each loss function $L_\theta$, $L_{w,l}$, $L_c$ may, in some embodiments, be a mean square error (MSE) function. Each loss function $L_\theta$, $L_{w,l}$, $L_c$ may, in some other embodiments, be a Huber Loss function. In some examples, the loss weights may be set at $w_\theta=1$, $w_{w,l}=2$, $w_c=1$. In other examples, the loss weights may be set at $w_\theta=5$, $w_{w,l}=1$, $w_c=2$.

Once an overall loss of the bounding box estimator 124 has been determined, there exists a need for a mechanism to propagate the overall loss back, so that the weights or biases associated with the nodes of each of the MLPs 424 and the nodes of the FCLs 412A, 412B, 412C, 414A, 414B, 414C, 416A, 416B, 416C may be updated.

Determining a derivative of the overall loss function in terms of the weights or biases can assist in the updating of the weights or biases associated with the inputs of the nodes of each of the MLPs 424 and the nodes of the FCLs 412A, 412B, 412C, 414A, 414B, 414C, 416A, 416B, 416C.

Both the first and second neural networks 410, 411, including the MLPs 424 and the FCLs 412A, 412B, 412C, 414A, 414B, 414C, 416A, 416B, 416C may be implemented in the python programming language. Furthermore, mechanisms are known for updating weights or biases associated with the nodes of MLPs 424 and the FCLs 412A, 412B, 412C, 414A, 414B, 414C, 416A, 416B, 416C of the first and second neural networks 410, 411 so as to propagate the overall loss back through the first and second neural networks 410, 411, including the sub-networks 410, 412, 414, 416.

In example embodiments, the first and second neural networks 410, 411 of the bounding box estimator 124 are trained together using a test data set (such as the KITTI Vision Benchmark Suite, mentioned hereinbefore) until a satisfactory level of performance is achieved. For a given data set, 80% of the test data set may be used to generate a training data set comprising sets of unordered 2D data points used for training. The remaining 20% of the test data set may be used to generate a validation data set. That is, upon training the first and second neural networks 410, 411 of the bounding box estimator 124 together using the training data set, a level of performance achieved on the validation data set may be evaluated. A satisfactory level of performance can be defined as a level performance for which evaluating further input from the validation data set provides losses that cease improving. That is, the loss function ceases to show a decreasing trend.

Figure 5:
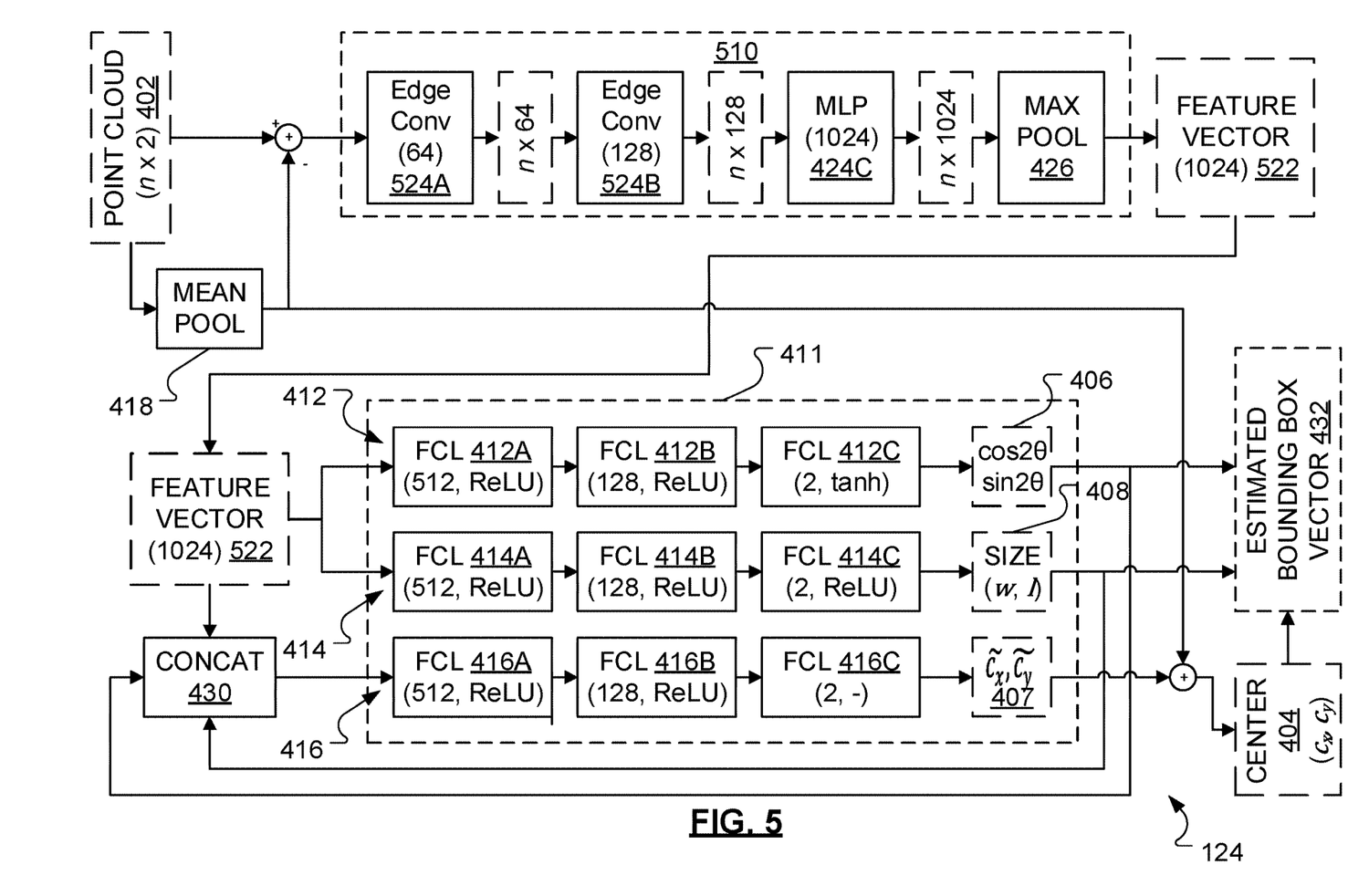
FIG. 5 is a block diagram showing logical components of a bounding box estimator, in accordance with aspects of the present application.

FIG. 5 shows an embodiment of the bounding box estimator 124 that is an alternative to the embodiment of FIG. 4.

In common with the embodiment of FIG. 4, the embodiment of FIG. 5 receives, as input, the set 402 of unordered 2D data points (e.g., a 2D point cloud) representative of an object.

The mean pool 418 determines the point cloud mean, ($\bar{x}$, $\bar{y}$). At the subtraction function 420, the point cloud mean, ($\bar{x}$, $\bar{y}$), is subtracted from each of the n data points of the input set 402 of data points, thereby giving a set of 2n mean-reduced values. The subtraction function 420 passes the set of n mean-reduced values into an alternative feature extraction sub-network 510. The output of the alternative feature extraction sub-network 510 is an extracted feature vector 522.

In the embodiment illustrated in FIG. 5, the first neural network 510 includes two EdgeConvs: a first EdgeConv 524A; and a second EdgeConv 524B. The alternative feature extraction sub-network 510 also includes the third MLP 424C, familiar from FIG. 4. The third MLP 424C is followed by the maximum pooling function 426, familiar from FIG. 4. The extracted feature vector 522 at the output of the alternative feature extraction sub-network 510 is passed to the second neural 411 configured for bounding box regression.

As is known in the art, instead of generating features directly from embeddings, an EdgeConv generates edge features that describe the relationships between a data point and its neighbors. An EdgeConv is designed to be invariant to the ordering of neighbors and, thus, is designed to be permutation invariant.

In a manner similar to the MLPs 424, each EdgeConv 524 may be implemented in the python programming language.

In example embodiments, once the bounding box estimator 124 has been trained, the bounding box estimator 124 may be used in combination with other modules present in the vehicle 100 to enable autonomous or assisted driving. In example embodiments, once the bounding box estimator 124 has been trained, code and data, which enable the bounding box estimator 124 of the processing unit 200 of FIG. 3, can be copied to or transferred to other processing units, thereby enabling those processing units to implement respective bounding box estimators on other vehicles or devices.

The use cases for bounding box estimation are widely varied. Bounding box estimation has been described in the foregoing in the context of path planning for autonomous vehicles. An estimation of a bounding box for each object in an environment allows an autonomous vehicle to make path planning decisions. The autonomous vehicle benefits from information determined regarding location and size of the objects so that optimal path planning decisions can be made.

In another use case, a bounding box estimation can be used to locate an individual person, such that bounding box estimation may find application in tracking systems. Such tracking systems may be employed to count and track movements of people. In a subway station, for example, counting and tracking movements of people can allow for the collection of statistics regarding a flow of people in and out of a particular entrance. In view of FIG. 3, when bounding box estimation is used in the context of tracking systems, the processing unit 200 may not include the path planning system 130 or the vehicle control system 140.

Conveniently, aspects of the present application are limited to using sets of 2D data points when estimating a bounding box for a given object. Known methods may be considered to be much more computationally intensive in that such known methods tend focus on 3D data points and provide end-to-end solution. While end-to-end solution is good, it may not be applicable to some cases. For example, very limited sensory information may be available when only 2D detection and ranging is used. In such a case, most existing methods estimate bounding box using non-learning methods. Non-learning methods may be considered to be unable to handle situations wherein the object is occluded. Additionally, non-learning methods may be considered to be unable to handle situations with noisy data. It can be shown that a bounding box estimation determined using aspects of the present application outperforms existing methods for situations that feature occlusion and/or noisy input.

According to an aspect of the present disclosure, there is provided a method. The method includes receiving a point cloud representing an object in an environment, the point cloud comprising a set of 2D data points and estimating, using a deep learning network, a 2D bounding box for the object represented by the point cloud. In the method, each 2D data point may include two coordinate values. In any of the preceding aspects, the estimating the bounding box may include using an initial sub-network of the deep learning network to extract feature vector information from the point cloud to output an extracted feature vector. In any of the preceding aspects, the estimating the bounding box may include using a first sub-network of the deep learning network to estimate an orientation of the bounding box based on the extracted feature vector, using a second sub-network of the deep learning network to estimate a size of the bounding box based on the extracted feature vector and using a third sub-network of the deep learning network to estimate a center of the bounding box based on the extracted feature vector. In any of the preceding aspects, the third sub-network of the deep learning network may estimate the center of the bounding box also based on the estimated orientation of the bounding box estimated by the first sub-network and/or the estimated size of the bounding box estimated by the second sub-network.

According to another aspect of the present disclosure, there is provided a system. The system includes at least one lidar sensor for obtaining raw sensor data representing an environment of the lidar sensor and a data analysis system. The data analysis system is configured to receive the raw sensor data, process the raw sensor data to generate a point cloud comprising a set of data as 2D data points, the point cloud representing an object in the environment, and to estimate, using a deep learning network, a 2D bounding box for the object represented by the point cloud. The data analysis system may be further configured to estimate the bounding box by using an initial sub-network of the deep learning network to extract feature vector information from the point cloud to output an extracted feature vector. In any of the preceding aspects, the data analysis system may be further configured to estimate the bounding box by using a first sub-network of the deep learning network to estimate an orientation of the bounding box based on the extracted feature vector, using a second sub-network of the deep learning network to estimate a size of the bounding box based on the extracted feature vector and using a third sub-network of the deep learning network to estimate a center of the bounding box based on the extracted feature vector. In any of the preceding aspects, the third sub-network of the deep learning network may estimate the center of the bounding box also based on the estimated orientation of the bounding box estimated by the first sub-network and/or the estimated size of the bounding box estimated by the second sub-network.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

What is claimed is:

1. A method for estimating a 2D object bounding box for an object, the method comprising:
receiving a 3D point cloud that is representative of a particular object;
processing the 3D point cloud to generate a set of unordered two-dimensional data points, the set of unordered two-dimensional data points representing a projection of 3D point cloud to a bird's eye view (BEV) of a space surrounding a detecting and ranging (DAR) sensor that includes the particular object, wherein each data point in the set of unordered two-dimensional data points includes a first coordinate value and a second coordinate value;

generating a set two-dimensional mean-reduced data points from the set of unordered two-dimensional data points by, for each data point in the set of unordered two-dimensional data points:

subtracting a first mean from the first coordinate value to generate a first mean-reduced value;

determining a second mean of the second coordinate values;

subtracting the second mean from the second coordinate values to generate a second mean-reduced value;

generating a two-dimensional mean-reduced data point comprising the first mean-reduced values and the second mean-reduced values;

generating, by a first neural network configured for feature extraction, a feature vector based on the set of mean-reduced data points; and generating, by a second neural network configured for bounding box regression, a bounding box vector representative of a two-dimensional bounding box for the object based on the feature vector, the bounding box vector including a value representative of a width for a bounding box for the object, a value representative of a length for the bounding box, a value representative of an orientation angle for the bounding box, and values representative of a center for the bounding box;

wherein generating, by the second neural network configured for bounding box regression, the bounding box vector for the object based on the feature vector comprises:

estimating, using an orientation-estimating sub-network of the second neural network configured for bounding box regression, a bounding box orientation vector for the bounding box based on the feature vector, the bounding box orientation vector defining the value representative of an orientation angle for the bounding box;

estimating, using a size-estimating sub-network of the second neural network configured for bounding box regression, a size vector for the bounding box based on the feature vector, the size vector defining the value representative of the width for a bounding box for the object and the value representative of a length for the bounding box;

concatenating, to the feature vector, the bounding box orientation vector and the size vector to generate a concatenated vector; and estimating, using a center-estimating sub-network of the second neural network configured for bounding box regression, a center vector for the bounding box based on the concatenated vector, the center vector defining the values representative of a center for the bounding box.

2. The method of claim 1, wherein the bounding box has an orientation angle and the bounding box orientation vector comprises:

a cosine value representative of a cosine function applied to a doubling of the orientation angle; and a sine value representative of a sine function applied to the doubling of the orientation angle.

3. The method of claim 1, further comprising:

training the first neural network and the second neural network together to update the weights and biases of the first neural network and second neural network until an overall loss function is optimized.

4. The method of claim 1, further comprising:

receiving, at a data analysis system, sensor data comprising the 3D point cloud captured by the DAR sensor;

processing, at the data analysis system, the sensor data to generate one or more 3D point clouds, each 3D point cloud representative of an object detected by the DAR sensor.

5. A processing unit comprising:

electronic storage storing computer readable instructions;

a processor configured to execute the instructions to:

receive sensor data provided by a detection and ranging (DAR) sensor, the sensor data comprising a 3D point cloud that is representative of a particular object;

process the sensor data to generate one or more sets of unordered two-dimensional data points, each set of unordered two-dimensional data points representing a projection of 3D point cloud to a bird's eye view (BEV) of the space surrounding the DAR sensor that includes the particular object, wherein each data point in the set of unordered two-dimensional data points includes a first coordinate value and a second coordinate value;

generate a set two-dimensional mean-reduced data points from the set of unordered two-dimensional data points by, for each data point in the set of unordered two-dimensional data points:

subtracting a first mean from the first coordinate value to generate a first mean-reduced value;

determining a second mean of the second coordinate values;

subtracting the second mean from the second coordinate values to generate a second mean-reduced value;

generating a two-dimensional mean-reduced data point comprising the first mean-reduced values and the second mean-reduced values;

generate, by a first neural network configured for feature extraction, a feature vector based on the set of mean-reduced data points; and generate, by a second neural network configured for bounding box regression, a bounding box vector representative of a two-dimensional bounding box for the object based on the feature vector, the bounding box vector including a value representative of a width for a bounding box for the object, a value representative of a length for the bounding box, a value representative of an orientation angle for the bounding box, and values representative of a center for the bounding box;

wherein the second neural network configured for bounding box regression, to generate the bounding box vector for the object based on the feature vector, is configured to:

estimate, using an orientation-estimating sub-network of the second neural network configured for bounding box regression, a bounding box orientation vector for the bounding box based on the feature vector, the bounding box orientation vector defining the value representative of an orientation angle for the bounding box;

estimate, using a size-estimating sub-network of the second neural network configured for bounding box regression, a size vector for the bounding box based on the feature vector, the size vector defining the value representative of the width for a bounding box for the object and the value representative of a length for the bounding box;

concatenate, to the feature vector, the bounding box orientation vector and the size vector to generate a concatenated vector; and estimate, using a center-estimating sub-network of the second neural network configured for bounding box regression, a center vector for the bounding box based on the concatenated vector, the center vector defining the values representative of a center for the bounding box.

6. The processing unit of claim 5, wherein the orientation-estimating sub-network comprises:
a first fully connected layer configured to receive the feature vector;
a second fully connected layer configured to receive output from the first fully connected layer; and
a third fully connected layer configured to:
receive output from the second fully connected layer; and
generate the bounding box orientation vector.

7. The processing unit of claim 5, wherein the size-estimating sub-network comprises:
a first fully connected layer configured to receive the feature vector;
a second fully connected layer configured to receive output from the first fully connected layer; and
a third fully connected layer configured to:
receive output from the second fully connected layer; and
generate the size vector.

8. The processing unit of claim 5, wherein the center-estimating sub-network comprises:
a first fully connected layer configured to receive the concatenated vector;
a second fully connected layer configured to receive output from the first fully connected layer; and
a third fully connected layer configured to:
receive output from the second fully connected layer; and
generate the center vector.

9. The processing unit of claim 5, wherein the processor is further configured to execute the instructions to train the first neural network and the second neural network together to update the weights and biases of the first neural network and second neural network until an overall loss function is optimized.

10. The processing unit of claim 5, wherein the bounding box has an orientation angle and the bounding box orientation vector comprises:
a cosine value representative of a cosine function applied to a doubling of the orientation angle; and
a sine value representative of a sine function applied to the doubling of the orientation angle.

11. The processing unit of claim 5, wherein the processor is configured to:
receive sensor data comprising the 3D point cloud captured by the DAR sensor;
process the sensor data to generate one or more 3D point clouds, each 3D point cloud representative of an object detected by the DAR sensor;
provide each of the one or more 3D point clouds to the bounding box estimator.

12. A non-transitory computer-readable medium storing instructions, which, in response to execution by a processor of a processing unit cause the processor to estimate a 2D object bounding box for an object by:
receiving a 3D point cloud that is representative of a particular object;
processing the 3D point cloud to generate a set of unordered two-dimensional data points, the set of unordered two-dimensional data points representing a projection of 3D point cloud to a bird's eye view (BEV) of the space surrounding a detecting and ranging (DAR) sensor that includes the particular object, wherein each data point in the set of unordered two-dimensional data points includes a first coordinate value and a second coordinate value;
generating a set two-dimensional mean-reduced data points from the set of unordered two-dimensional data points by, for each data point in the set of unordered two-dimensional data points:
subtracting a first mean from the first coordinate value to generate a first mean-reduced value;
determining a second mean of the second coordinate values;
subtracting the second mean from the second coordinate values to generate a second mean-reduced value;
generating a two-dimensional mean-reduced data point comprising the first mean-reduced values and the second mean-reduced values;
generating, by a first neural network configured for feature extraction, a feature vector based on the set of mean-reduced data points; and
generating, by a second neural network configured for bounding box regression, a bounding box vector representative of a two-dimensional bounding box for the object based on the feature vector, the bounding box vector including a value representative of a width for a bounding box for the object, a value representative of a length for the bounding box, a value representative of an orientation angle for the bounding box, and values representative of a center for the bounding box;
wherein generating, by the second neural network configured for bounding box regression, the bounding box vector for the object based on the feature vector comprises:
estimating, using an orientation-estimating sub-network of the second neural network configured for bounding box regression, a bounding box orientation vector for the bounding box based on the feature vector, the bounding box orientation vector defining the value representative of an orientation angle for the bounding box;
estimating, using a size-estimating sub-network of the second neural network configured for bounding box regression, a size vector for the bounding box based on the feature vector, the size vector defining the value representative of the width for a bounding box for the object and the value representative of a length for the bounding box;
concatenating, to the feature vector, the bounding box orientation vector and the size vector to generate a concatenated vector; and
estimating, using a center-estimating sub-network of the second neural network configured for bounding box regression, a center vector for the bounding box based on the concatenated vector, the center vector defining the values representative of a center for the bounding box.

13. The non-transitory computer-readable medium of claim 12, wherein the bounding box has an orientation angle and the bounding box orientation vector comprises:
   a cosine value representative of a cosine function applied to a doubling of the orientation angle; and
   a sine value representative of a sine function applied to the doubling of the orientation angle.

14. The non-transitory computer-readable medium of claim 12, wherein the instructions, in response to execution by the processor of the processing unit, cause the processor to:
   train the first neural network and the second neural network together to update the weights and biases of the first neural network and second neural network until an overall loss function for the bounding box estimator is optimized.

15. The non-transitory computer-readable medium of claim 12, wherein the instructions, in response to execution by the processor of the processing unit, cause the processor to:
   receive sensor data comprising the 3D point cloud captured by the DAR sensor;
   process the sensor data to generate one or more 3D point clouds, each 3D point cloud representative of an object detected by the DAR sensor;
   provide each of the one or more 3D point clouds to the bounding box estimator.

* * * * *